United States Patent [19]

Nishimura et al.

[11] Patent Number: 4,584,204

[45] Date of Patent: Apr. 22, 1986

[54] METHOD FOR PREPARING A SHRIMP-LIKE FISH MEAT PRODUCT

[75] Inventors: Tatsuo Nishimura; Ryo Sugawara, both of Tokyo; Takashi Ichitani, Shizuoka; Susumu Obata, Chiba, all of Japan

[73] Assignee: Taiyo Gyogyo Kabushiki Kaisha, Tokyo, Japan

[21] Appl. No.: 455,008

[22] Filed: Jan. 3, 1983

[51] Int. Cl.$^4$ .............................. A23L 1/325
[52] U.S. Cl. ..................... 426/643; 426/802
[58] Field of Search ............... 426/104, 574, 643, 802

[56] References Cited

U.S. PATENT DOCUMENTS

| | | | |
|---|---|---|---|
| 3,493,391 | 2/1970 | Pottie | 99/111 |
| 3,852,487 | 12/1974 | VanWerven et al. | 426/149 |
| 3,863,017 | 1/1975 | Yueh | 426/376 |
| 3,892,866 | 7/1975 | Kanemitsu | 426/72 |
| 3,922,372 | 11/1975 | Hasegawa | 426/574 |
| 3,931,415 | 1/1976 | Larsen et al. | 426/1 |
| 3,955,011 | 5/1976 | Niki et al. | 426/643 |
| 4,060,642 | 11/1977 | Suzuki | 426/104 |
| 4,062,409 | 12/1977 | Niki et al. | 426/643 |
| 4,158,065 | 6/1979 | Sugino | 426/104 |
| 4,167,590 | 9/1979 | Rogozhin et al. | 426/574 |
| 4,181,749 | 1/1980 | Niki et al. | 426/643 |
| 4,215,153 | 7/1980 | Kai et al. | 426/643 |
| 4,277,513 | 7/1981 | Rufer et al. | 426/656 |
| 4,303,688 | 12/1981 | Shimura et al. | 426/513 |
| 4,362,752 | 12/1982 | Sugino et al. | 426/574 |
| 4,371,560 | 1/1983 | Hochhauser et al. | 426/643 |
| 4,396,634 | 8/1983 | Shenouda et al. | 426/104 |

FOREIGN PATENT DOCUMENTS 2292437  6/1976  France .

OTHER PUBLICATIONS

Suzuki, T., *Fish and Krill Protein: Processing Technology*, Chapters II and III, 1981.
Redmayne, P., "Going 'High Tech' with Surimi", *Ocean Leader*, pp. 16–17, Winter, 1981.
"Seafood 'Pieces' is Shellfish Alternative", *The Evening Gazette*, Mar. 18, 1981.

*Primary Examiner*—Raymond Jones
*Assistant Examiner*—Marianne M. Cintins
*Attorney, Agent, or Firm*—Christensen, O'Connor, Johnson & Kindness

[57] ABSTRACT

A fish meat product similar in taste and texture to shrimp which contains from about 15 to about 45 parts by weight of wavy fish gel fibers, from about 15 to about 50 parts by weight of linear fish gel fibers, and from about 30 to about 55 parts by weight of a fish paste binder is disclosed. The wavy fibers range from about 1.0 to about 4.0 mm in diameter, and the linear fibers range from about 0.3 to about 3.0 mm in thickness on each side. The fish gel from which the fibers are made is prepared from surimi by the use of a process which is very similar to that employed in preparing "Kamaboko," and an intermediate product in this process is a fish paste which is used as the binder. The foregoing components are mixed in the foregoing ratio. The resultant mixture is formed into the shape of peeled shrimp, coated on the surface with an appropriate coloring agent, and heated.

14 Claims, No Drawings

METHOD FOR PREPARING A SHRIMP-LIKE FISH MEAT PRODUCT

FIELD OF THE INVENTION

This invention relates to a product similar in texture and taste to shrimp and consisting essentially of fish meat, and a method for preparing such a product.

BACKGROUND OF THE INVENTION

In recent years, there has been an increased demand for health food. In this regard, seafood has come into high regard in advanced industrial countries because of its high protein and low calorie content. The demand has been particularly high for crustaceans such as crab, shrimp or scallops because of their relatively mild flavor, excellent taste and texture. Unfortunately, crustaceans are becoming more expensive to catch, process and market and are less readily available because of a number of factors, including the restrictions imposed by many countries on fishing in their off-shore waters and the increased cost of energy. In view of the continued high demand for crustaceans, methods have been developed for preparing crustacean-like products from fish meat. Examples of such products and their processes can be found in U.S. Pat. Nos. 3,863,017, Yueh, 4,158,065, Sugino, and 4,303,688, Shimura et al. Using the processes set forth in these patents and similar processes, a variety of fish meat products similar in texture and taste to crabs and scallops have been produced and marketed. It previously has not been feasible, however, to prepare a fish meat product similar in texture and taste to shrimp, because shrimp meat has a complex muscle structure in which the muscles are composed of intricately interwined bundles of muscle fibers that are from several microns to several hundred microns in diameter.

SUMMARY OF THE INVENTION

The inventors have found that a fish meat product having a texture very close to that of shrimp may be obtained by various combination of wavy fish gel fibers having a certain size, linear fish gel fibers having a certain size, and a fish paste binder. The starting material for each component is surimi made from fish meat, although fresh or frozen fish meat may be employed provided that it is first processed in a manner similar to surimi. In preparing the wavy fish gel fibers and the linear fish gel fibers, a process is used which is very similar to that employed in preparing the traditional Japanese food "Kamaboko".

Preferably, the shrimp-like fish meat product comprises: from about 15 to about 45 parts by weight of the wavy fish gel fibers, these fibers ranging from about 1.0 to about 4.0 mm in diameter, and from about 2.0 to about 18.0 mm in length; from about 15 to about 50 parts by weight of the linear fish gel fibers, these fibers ranging from about 0.3 to about 3.0 mm in thickness on each side, and from about 3.0 to about 18.0 mm in length; and from about 30 to about 55 parts by weight of the fish paste binder. If desired, krill, shrimp, cod, or any other seafood that is commonly employed in preparing fish meat products, may be added. These components are first mixed in the aforesaid ratio. The resulant mixture is formed into the shape of peeled shrimp, coated on the surface with an appropriate coloring agent, and then heated so as to prepare the desired shrimp-like fish meat product.

DESCRIPTION OF THE PREFERRED EMBODIMENT

The invention will be described with reference to the starting materail utilized, the preparatory processes for preparing wavy fish gel fibers, linear fish gel fibers, and fish paste binder from that starting material, and the main process for preparing the desired shrimp-like product from these components.

STARTING MATERIAL

Preferably, the starting material is "surimi" which may be either raw, "nama" surimi or frozen surimi. To understand the nature of surimi, a brief description of its processing will be given.

The fish meat that is used to prepare surimi is typically that obtained from Alaska pollack, although other types of white fish, such as cod, croaker, eel and shark can be used. The whole fish is dressed and filleted to remove internal organs, and washed to remove blood and other contaminants. After washing, the fillets are fed to a separator to collect the fish meat, with the collected meat being termed "otoshimi" and being in small lumps. The otoshimi is then washed with water to remove water-soluble proteins, strained to remove excess water, and minced. In the case of frozen surimi, antidenaturants such as sugar are mixed with the minced meat in order to maintain its surimi quality over an extended period of time. If "ka-en" surimi is to be produced, the minced meat is then salted. If "mu-en" surimi is to be produced, the minced meat is left unsalted. The minced meat is then formed into a block. At this point, the processing of raw surimi is complete. In the case of frozen surimi, the minced meat is filled into a polyethylene bag and packed in a pan having the desired shape of the block. The blocks are then rapidly frozen in a contact freezer, and remain frozen until used. For further details relating to surimi and its preparation, reference should be made to Chapter III of Suzuki, "Fish and Krill Protein: Processing Technology", 1981.

The quality of surimi will vary widely depending on the specific fish meat and process used and will thus directly affect the quality of the shrimp-like product prepared by the process of this invention. Preferably, the surimi is frozen, "floating factory" surimi prepared from Alaska pollack on factory ships in the North Pacific. Surimi of this type has a higher quality, is harder and whiter, and possesses a better flavor than "land pack" surimi prepared from frozen fish of various types in land-based factories.

PREPARATORY PROCESSES

(1) Wavy Fish Gel Fibers

Surimi is sliced and mixed with salt, starch, an edible oil, condiments, a reinforcing agent of elasticity such as a wheat protein, and shrimp flavoring. The resultant mixture is then ground and kneaded to form a fish paste. The paste is stretched into the form of a sheet having a thickness from about 20 to about 50 mm. The fish paste is then allowed to set until it exhibits elasticity. This setting may be effected at a temperature of 40° C. for two hours, at a temperature of 18° C. for twenty hours, or at a temperature of 5° C. for forty hours.

Those skilled in the art will recognize this process as very similar to a typical process for preparing Kamaboko, with the exception that the temperature to which the mixture is subjected is much lower than that typically used in a Kamaboko process, (e.g., 75°-100° C.). As a result, the fish paste prepared in this manner sets into a gel that does not have substantial Kamaboko-forming properties. Furhter details concerning typical Kamaboko processes may be found in Chapter II of the Suzuki publication previously discussed.

After setting, the sheet of fish gel is divided into elongated, wavy fibers of substantially circular cross-section having a diameter from about 1.0 to about 4.0 mm and a length from about 2.0 to about 18.0 mm. These fibers may be produced in any convenient manner, such as by the use of a chopper and extruder having a mesh size in the desired range.

(2) Fish Gel Slices

A sheet of fish gel is produced in a manner identical to that previously described for the fish gel fibers. After setting, the sheet of fish gel is sliced by a rotary or straight cutter into elongated, linear fibers of substantially rectangular cross-section having a thickness from about 0.3 to about 3.0 mm on each side and a length from about 3.0 to about 18.0 mm.

(3) Fish Paste Binder

As with the fish gels previously described, surimi is sliced and mixed with the ingredients previously discussed to form a mixture which is ground and kneaded to form a fish paste; however, the fish paste is not allowed to set and is used as a binder for the fibers prepared in the manner described above.

MAIN PROCESS

The wavy fish gel fibers, the linear fish gel fibers, and the fish paste binder, all prepared as described above, are mixed in certain proportions. The mixture is then kneaded, molded into the shape of peeled shrimp by the use of a conventional molding device, coated on the surface with a coloring agent such as paprika, and heated so as to prepare the desired shrimp-like product. Heating may be accomplished by steaming at a temperature in the range of 70°-100° C. for a time from about one minute to about sixty minutes. Preferably, steaming is accomplished at 95° C. for about twenty to thirty minutes.

To demonstrate that shrimp-like taste and texture is most closely approximated by a product including a combination of wavy fish gel fibers and linear fish gel fibers, and initial study was conducted in which various groups of fish meat products were prepared by the processes previously described and subjected to appraisal by trained experts who attended specially arranged panel tests. The products prepared and their appraisal follows.

TABLE I

Shrimp-like Texture of Various Combinations of Wavy Fish Gel Fibers, Linear Fish Gel Fibers, and Fish Paste Binder

| | A<br>Wavy<br>Fibers<br>and Binder | B<br>Linear<br>Fibers<br>and Binder | C<br>Wavy Fibers<br>and Linear<br>Fibers and Binder | Appraisal |
|---|---|---|---|---|
| Group 1 | 80%+20% | 80+20% | 35%+30%+30% | C>A>B |
| Group 2 | 60%+40% | 60+40% | 30%+30%+40% | C>>A =B |
| Group 3 | 40%+60% | 40+60% | 20%+20%+60% | C>A =B |

From Table I, it will be noted that the product C in each of the groups, including both wavy fish gel fibers and linear fish gel fibers and the binder, received a higher appraisal than the corresponding products including only the wavy fish gel fibers and the binder (product A) or the linear fish gel fibers and the binder (product B). This initial study thus demonstrated that products including a combination of wavy fish gel fibers and linear fish gel fibers were superior in terms of shrimp-like taste and texture to those including only wavy fish gel fibers or only linear fish gel fibers.

A further study was then conducted by the inventors to determine the proportions of the various components and the sizes of the fish gel fibers that resulted in a fish meat product most closely approximating the texture of shrimp. In analyzing texture, the following factors were considered:

(1) the elastic feeling of the product when bit;
(2) the indentations produced on the surface of the product when bit;
(3) how intertwined were the fibers of the product; and
(4) how uneven the product felt to the teeth when chewed.

A number of samples of fish meat products were prepared using the process described with varying proportions of the wavy fish gel fibers, linear fish gel fibers, and binder, and subjected to appraisal. All samples were prepared using wavy fish gel fibers having a diameter of 1.8 mm and linear fish gel fibers having a thickness of 0.7 mm. The samples prepared and appraised, and the results of the appraisal, follow.

TABLE II

Proportions of Wavy Fish Gel Fibers, Linear Fish Gel Fibers, and Fish Paste Binder

| | Wavy Fibers (%) | Linear Fibers (%) | Binder (%) | Appraisal |
|---|---|---|---|---|
| Sample 1 | 35 | 45 | 20 | crumbly, poor texture binding insufficient, loose-textured |
| Sample 2 | 40 | 35 | 25 | loose as in (1), unacceptable |
| Sample 3 | 50 | 20 | 30 | blocky feel, different from shrimp texture, unacceptable |
| Sample 4 | 45 | 25 | 30 | slightly similar to shrimp texture |
| Sample 5 | 20 | 50 | 30 | same as in (4) |
| Sample 6 | 35 | 30 | 35 | closely similar in texture to shrimp |
| Sample 7 | 40 | 20 | 40 | closely similar in texture to shrimp |
| Sample 8 | 30 | 30 | 40 | closely similar in texture to shrimp |
| Sample 9 | 20 | 40 | 40 | closely similar in texture to shrimp |
| Sample 10 | 30 | 20 | 50 | shrimp-like texture rather weak |
| Sample 11 | 20 | 30 | 50 | shrimp-like texture rather weak |
| Sample 12 | 25 | 25 | 50 | shrimp-like texture rather weak |

TABLE II-continued

Proportions of Wavy Fish Gel Fibers,
Linear Fish Gel Fibers, and Fish Paste Binder

| | Wavy Fibers (%) | Linear Fibers (%) | Binder (%) | Appraisal |
|---|---|---|---|---|
| Sample 13 | 30 | 15 | 55 | shrimp-like texture rather weak |
| Sample 14 | 15 | 30 | 55 | shrimp-like texture rather weak |
| Sample 15 | 20 | 20 | 60 | texture only slightly similar to shrimp, unacceptable |
| Sample 16 | 15 | 20 | 65 | similar to Kamaboko, less fibrous contents, poor, unacceptable texture |

From Table II, it can been seen that samples 4 through 14 have a texture similar to that of shrimp and that samples 6 through 9 are most similar in texture to shrimp. Therefore, the proportions to obtain a shrimp-like texture should be from about 15 to about 45 parts by weight of wavy fish gel fibers, from about 15 to about 50 parts by weight of linear fish gel fibers, and from about 30 to about 55 parts by weight of fish paste binder. The preferable ranges are from about 20 to about 40 parts by weight of the wavy fibers, from about 20 to about 40 parts by weight of the linear fibers, and from about 35 to about 40 parts by weight of the binder. The exact proportions that are utilized, however, will be determined by various factors such as the quality and elasticity of the surimi, the manner in which the surimi is ground, and the setting time that is used to produce the fish gel.

In order to determine the size ranges of the wavy fish gel fibers and the linear fish gel fibers, additional samples of fish meat products were prepared using the processes described and appraised for shrimp-like texture. The smaples prepared and the results of the appraisal are set forth in Tables III and IV below. All samples were prepared using 30 parts by weight of the wavy fibers, 30 parts by weight of the linear fibers, and 40 parts by weight of the binder. Those samples in Table III were prepared using a varying diameter of the wavy fish gel fibers and a thickness of the linear fish gel fibers of 0.7 mm, and those samples in Table IV were prepared using a diameter of the wavy fish gel fibers of 1.8 mm and a varying thickness of the linear fish gel fibers.

TABLE III

Relation Between Size of Wavy Fish Gel Fibers and Shrimp-like Texture

| | Wavy Fish Gel Fibers Diameter × Length | Shrimp-like Texture |
|---|---|---|
| Sample 1 | 0.6 mm × 10 mm | weak and unacceptable |
| Sample 2 | 1.0 mm × 10 mm | slightly similar to shrimp |
| Sample 3 | 1.4 mm × 10 mm | " |
| Sample 4 | 1.8 mm × 10 mm | similar to shrimp |
| Sample 5 | 2.2 mm × 10 mm | " |
| Sample 6 | 2.6 mm × 10 mm | " |
| Sample 7 | 3.0 mm × 10 mm | " |
| Sample 8 | 3.4 mm × 10 mm | slightly similar to shrimp |
| Sample 9 | 3.8 mm × 10 mm | " |
| Sample 10 | 4.0 mm × 10 mm | positive, though weak |
| Sample 11 | 4.4 mm × 10 mm | fibers too thick, unacceptable |

TABLE IV

Relation Between Size of Linear Fish Gel Fibers and Shrimp-like Texture

| | Linear Fish Gel Fibers Thickness × Lenght | Shrimp-like Texture |
|---|---|---|
| Sample 1 | 0.3 mm × 10 mm | slightly similar to shrimp |
| Sample 2 | 0.5 mm × 10 mm | similar to shrimp |
| Sample 3 | 0.7 mm × 10 mm | " |
| Sample 4 | 1.0 mm × 10 mm | " |
| Sample 5 | 1.4 mm × 10 mm | " |
| Sample 6 | 1.8 mm × 10 mm | " |
| Sample 7 | 2.2 mm × 10 mm | " |
| Sample 8 | 2.6 mm × 10 mm | " |
| Sample 9 | 3.0 mm × 10 mm | " |
| Sample 10 | 3.4 mm × 10 mm | fibers somewhat too thick, unacceptable |
| Sample 11 | 3.8 mm × 10 mm | fibers somewhat too thick, unacceptable |
| Sample 12 | 4.2 mm × 10 mm | fibers somewhat too thick, unacceptable |
| Sample 12 | 4.6 mm × 10 mm | fibers somewhat too thick, unacceptable |

From Table III, it can be noted that samples 2 through 10 possessed acceptable shrimp-like texture. From Table IV, it can be noted that samples 1 through 9 possessed acceptable shrimp-like texture. Accordingly, the wavy fish gel fibers should have a diameter in the range from about 1.0 to about 4.0 mm, and preferably from about 1.8 to about 3.0 mm, and the linear fish gel fibers should have a thickness from about 0.3 to about 3.0 mm. and preferably from about 0.5 to about 3.0 mm, to provide a product having a shrimp-like texture.

In order to improve the texture and taste of the shrimp-like product, krill and shrimp may be added in any of the preparatory processes or in the main process prior to the time that the various components are mixed. Because krill and shrimp are expensive, they are preferably limited in amount to less than 60% by weight of the resultant shrimp-like product.

The invention will be described further by reference to the following specific examples.

EXAMPLE I

The following ingredients were used in preparing a mixture for making wavy fish gel fibers, linear fish gel fibers, and fish paste binder.
Frozen surimi of Alaska pollack—100 wt parts
Water—25 wt parts
Starch—4 wt parts Vegetable oil—2.5 wt parts
Shrimp extract—2.5 wt parts Monosodium glutamate—0.5 wt parts Glycin—0.5 wt part Wavy fish gel fibers having a diameter of 1.8 mm and a length of 10.0 mm, linear fish gel fibers having a thickness of 0.7 mm and a length of 10.0 mm, and fish paste binder were each prepared from the above ingredients by subjecting the same to the previously described preparatory processes. Those components were then mixed in the following proportions and subjected to the main process previously described to make a fish meat product.
Wavy fish gel fibers—34 wt parts
Linear fish gel fibers—26 wt parts
Fish paste binder—40 wt parts The fish meat product according to Example 1 was found to have a texture and taste similar to shrimp.

EXAMPLE II

During the main process, the various components prepared according to Example 1 were mixed with krill in the following proportions to make a fish meat product.

Wavy fish gel fibers—30 wt parts
Linear fish gel fibers—27 wt parts
Fish paste binder—35 wt parts
Krill—8 wt parts The fish meat product according to Example 2 was found to have a texture and taste similar to shrimp.

While the invention has been described with reference to a preferred embodiment and several examples, it is to be clearly understood by those skilled in the art that the invention is not limited thereto and that the scope of the invention is to be interpreted only in conjunction with the appended claims.

The embodiments of the invention in which an exclusive property or privilege is claimed are as follows:

1. A method for preparing a shrimp-like fish meat product, said method comprising the steps of:
    preparing a fish paste from surimi, said fish paste including shrimp flavoring;
    allowing a portion of said fish paste to set to form a fish gel;
    forming a first portion of said fish gel into wavy fibers ranging from about 1.0 to about 4.0 min in diameter;
    forming a second portion of the said fish gel into linear fibers ranging from about 0.3 to about 3.0 mm in thickness;
    mixing said wavy fish gel fibers, said linear fish gel fibers, and said fish paste as a binder in the following proportions: from about 15 to about 45 parts by weight of said wavy fibers, from about 15 to about 50 parts by weight of said linear fibers, and from about 30 to about 55 parts by weight of said binder;
    forming the mixture of said wavy fibers, said linear fibers, and said binder into a desired shape; and,
    heating said mixture to form said shrimp-like fish meat product.

2. The method of claim 1, wherein said wavy fish gel fibers range from about 2.0 to about 18.0 mm in length.

3. The method of claim 1, wherein said linear fish gel fibers range from about 3.0 to about 18.0 mm in length.

4. The method of claim 1, further comprising the step of adding seafood to said fish meat product before said step of forming said mixture into desired shape, said seafood being of a type that is commonly employed in preparing fish meat products.

5. The method of claim 4, wherein said seafood is from about 1 to about 60 parts by weight of said fish meat product.

6. The method of claim 4, wherein said seafood is shrimp.

7. The method of claim 4, wherein said seafood is krill.

8. The method of claim 4, wherein said seafood is added to said mixture of said wavy fibers, said linear fibers, and said binder.

9. The method of claim 1, wherein said mixture is heated by steaming at a temperature in the range of 70° to 100° C. for a time from about one minute to about twenty minutes.

10. The method of claim 9, wherein said steaming is accomplished at a temperature of 90° C. for about 20 to about 30 minutes.

11. The method of claim 1, further comprising the step of coating the surface of said mixture, after said forming step and before said heating step, with a coloring agent.

12. The method of claim 1, wherein said step of forming said mixture into a desired shape includes the step of molding said mixture into the shape of a peeled shrimp.

13. The method of claim 1, wherein said surimi is frozen.

14. The method of claim 1, wherein said fish gel is prepared by: slicing and mixing surimi with salt, starch, an edible oil, condiments, a reinforcing agent of elasticity, and shrimp flavoring; grinding and kneading the resultant mixture to form said fish paste; stretching said fish paste into a sheet; and, allowing said stretched fish paste to set until it exhibits elasticity.

* * * * *

UNITED STATES PATENT AND TRADEMARK OFFICE
CERTIFICATE OF CORRECTION

PATENT NO. : 4,584,204

DATED : April 22, 1986

INVENTOR(S) : Nishimura et al.

It is certified that error appears in the above-identified patent and that said Letters Patent is hereby corrected as shown below:

| | |
|---|---|
| Column 1, line 66, | "resulant" should be --resultant-- |
| Column 2, line 7, | "materail" should be --material-- |
| Column 3, line 6, | "Furhter" should be --Further-- |
| line 51, | "and" should be --an-- |
| Column 5, line 41, | "smaples" should be --samples-- |
| Column 6, line 5, (Table IV, line 4) | "Lenght" should be --Length-- |
| Column 6, line 20, (Table IV, line 20) | "Sample 12" (2nd occurrence) should be --Sample 13-- |
| Column 7, line 28, (Claim 1, line 8) | "min" should be --mm-- |
| Column 8, line 7, (Claim 4, line 3) | Insert --a-- before "desired" |

Signed and Sealed this

Twelfth Day of August 1986

[SEAL]

Attest:

DONALD J. QUIGG

Attesting Officer

Commissioner of Patents and Trademarks